July 23, 1946.  P. J. O'CONNOR  2,404,396
METHOD OF CONSTRUCTING WALLS
Filed Aug. 9, 1944  2 Sheets-Sheet 1

INVENTOR.
PATRICK J. O'CONNOR
BY Harry J. Lucke
ATTORNEY

July 23, 1946.　　　P. J. O'CONNOR　　　2,404,396
METHOD OF CONSTRUCTING WALLS
Filed Aug. 9, 1944　　　2 Sheets-Sheet 2
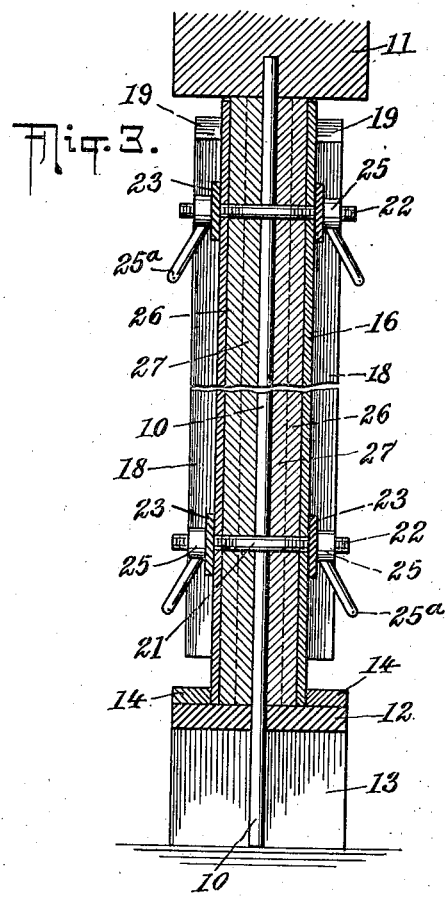
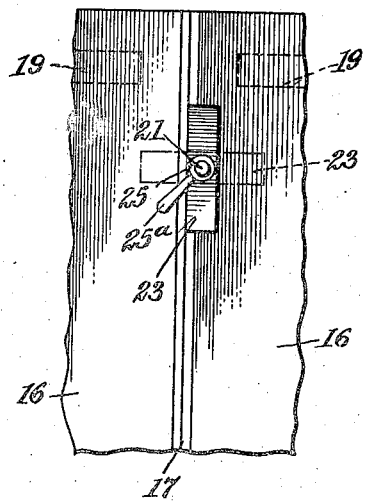
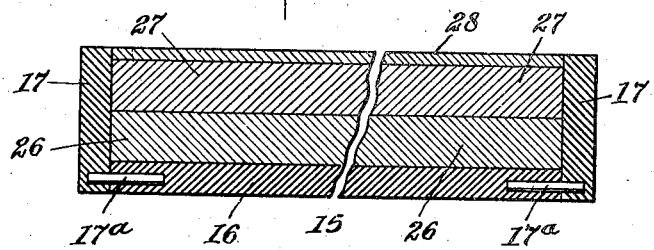
INVENTOR.
PATRICK J. O'CONNOR
BY
ATTORNEY Patented July 23, 1946

2,404,396

UNITED STATES PATENT OFFICE 2,404,396

METHOD OF CONSTRUCTING WALLS

Patrick J. O'Connor, New York, N. Y.

Application August 9, 1944, Serial No. 548,671

6 Claims. (Cl. 25—154)

My invention relates to improvements in wall constructions, and the same has for its object to provide a simple, efficient, reliable and inexpensive method of producing interior walls, partitions and the like.

Further, said invention has for its object to provide a method of producing a wall or partition in which the plaster material is formed as a slab and secured as such to a suitable supporting and reinforcing means.

Further, said invention has for its object to provide a method of producing a wall or partition in which a pair of correspondingly-shaped slabs of plaster material, while in a more or less plastic state, are brought together and secured to a suitable support to form a unitary structure.

Further, said invention has for its object to provide a method of producing a wall or partition in which a plurality of correspondingly-shaped slabs of plaster material, while in more or less plastic state, are produced and assembled in place upon a series of aligned, fixed supports to form a wall of any desired length and thickness.

Further, said invention has for its object to provide a method of producing a wall in which a plurality of pairs or sets of correspondingly-shaped slabs formed of plaster material may be prepared at the place of erection of the wall, and brought together, face to face, while in plastic state, from opposite sides of a series of aligned, spaced supports and permitted to set and solidify upon and enclose said supports.

Further, said invention has for its object to provide a method of producing a wall in which a plurality of pairs of correspondingly-shaped slabs of plaster material, such as cement, mortar or combinations of plaster materials, may be initially molded or shaped at opposite sides of a series of fixed aligned supports at the place of erection of the wall, and then raised, while still in plastic state, to vertical positions against the opposite sides of said series of supports and brought together under pressure and maintained so until the opposing surfaces of said slabs become united and the entire mass caused to set and solidified into an integral structure.

Other objects will, in part, be obvious, and, in part, be pointed out hereinafter.

To the attainment of the aforesaid objects and ends my invention consists in the novel features of construction, and in the combination, connection and arrangement of parts hereinafter more fully described and then pointed out in the claims.

In the accompanying drawings:

Figure 3 is an enlarged vertical section showing the trays in vertical position and clamped together in place with the plaster material intermediate the same;

Figure 4 is an enlarged detail front view of portions of two adjoining trays, and the means for clamping the opposing trays together in place; and Figure 5 is an enlarged, detail transverse section, on the line 5—5 of Figure 2 showing the construction of a tray, and the plaster material thereon.

Figure 1:
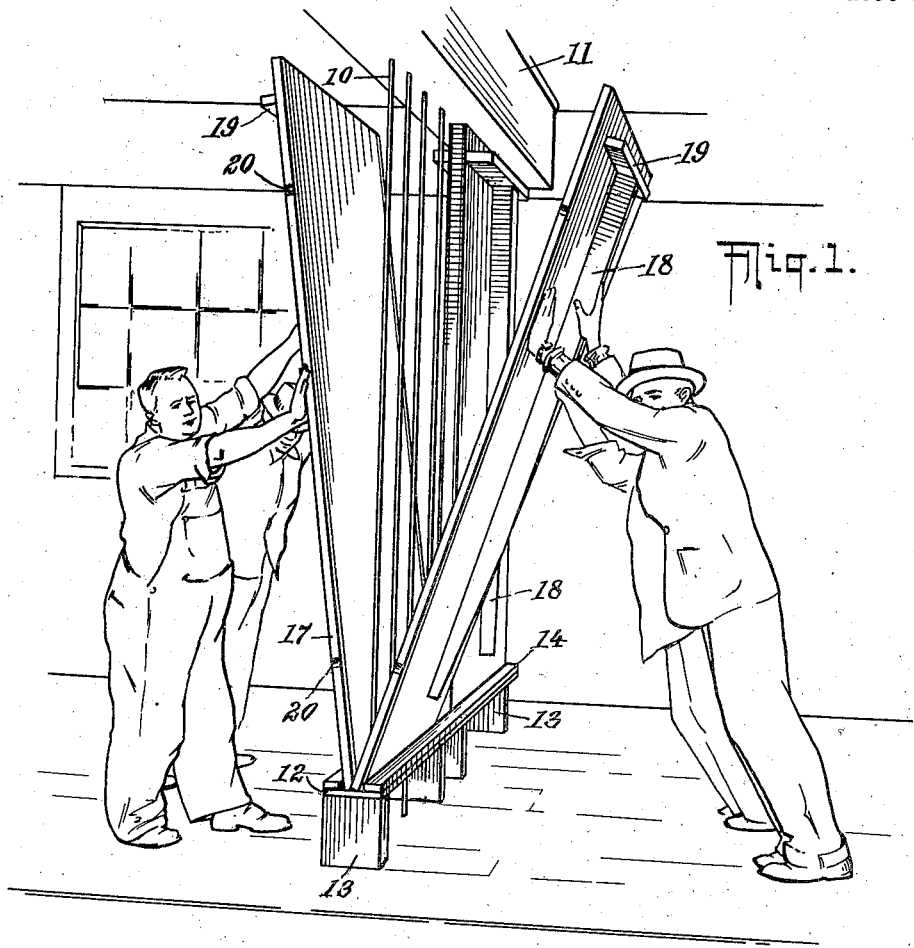
Figure 1 is a perspective view showing one form of wall construction embodying my said invention in the course of construction and erection.

In said drawings 10 designates a series of rods or channel irons arranged in aligned, vertical position, and constituting a vertical support. The said rods or channel bars 10 are arranged in equally spaced relation, and have their upper ends secured to the ceiling or ceiling beam 11 of a room, and their lower ends extending through apertures in a bar 12 and resting upon the floor. The said bar 12 is supported in raised position upon wooden blocks 13, and upon the upper side of said bar 12, along its longitudinal edges are secured furring strips 14. The said strips 14 are spaced apart a distance equal to the thickness of the finished wall.

15 denotes trays, each consisting of a base 16 formed of plywood or other suitable material, provided along its longitudinal edges with readily detachable rails 17 equal in height to approximately one-half of the thickness of the finished wall to be erected. The rails 17 are held in place by pins 17$^a$ extending into the edges of the base 16. Upon the rear or underside of the base is secured a central, longitudinal reinforcing member 18, terminating at one end against a transverse reinforcing member 19.

Each tray is provided along its edges with a series of substantially semi-circular recesses 20, to receive the ends of the tie rods or bolts 21 provided at their opposite ends with screw-threaded portions 22, and rectangular metal plates 23 having apertures therein. The threaded portions 22 are provided with clamping units 25 having actuating handles 25$a$ extending therefrom.

Figure 2:
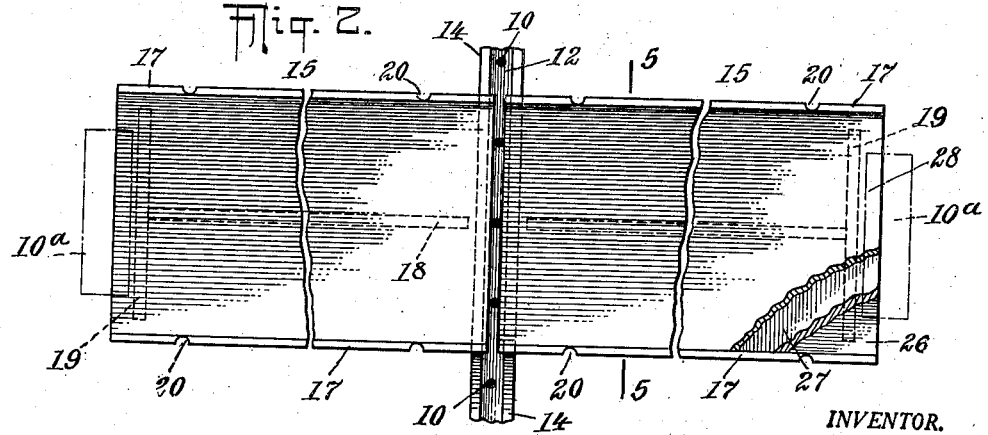
Figure 2 is a plan view, partly broken away and in section showing two registering trays in horizontal position with the plaster material thereon.

In constructing a partition or wall, I proceed as follows:

I first secure a series of blocks of wood 13 in a line along the floor corresponding to the position of the finished wall and secure thereto a wooden bar 12 having a series of equally-spaced holes 12a along the center line thereof, and then secure upon the upper side of said bar along its longitudinal edges the furring strips 14. The inner edges of said strips 14 are spaced apart a distance equal to the thickness of the finished wall. Hereupon the lower ends of the series of metal rods or channel bars 10 are secured at their upper ends in the ceiling of the room or to a beam 11, as illustrated at Figs. 1 and 2. Next the trays 15 are arranged in substantially horizontal position at both sides of the rods or channel bars 10 with their lower edges resting upon the furring strip 14, in close proximity to the rods or channel bars 10. The upper or outer ends of said trays 15 may be temporarily supported by blocks or other convenient means, as at 10a.

Hereupon plaster material comprising preferably three layers of which the lowermost layer 26 consisting of pure gypsum is first spread upon the tray to the depth of about three-fourths (¾) of an inch in thickness. The lower or undersurface of this layer will constitute one of the outer finished wall surfaces of the completed wall. Next a layer 27 of rough plaster consisting of gypsum one part (1), and sand two-and-one-half parts (2½) together with sufficient quantity of cocoanut fibre or cow's hair is spread upon the layer 26 to the depth of three-quarters (¾) of an inch, and finally a very thin, fluid mixture 28 of about ninety-seven (97) per cent. of pure gypsum and water, to which may be added, if desirable, a small quantity, about three (3) per cent. of glue, dextrine or other similar agglutinant, depending upon the nature of the specific plaster material used, to insure the due uniting of the two plaster slabs. The mass is then evenly spread upon the trays 15 to the height of the rails 17, or slightly above the same, depending upon the character of the specific plaster material used. When said mass has reached the proper consistency the corresponding or registering trays at opposite sides of the rods or channel bars 10 are raised to vertical position with the lower ends of said trays properly positioned between the furring strips 14, and the surfaces of the plaster layers brought into contact and enclosing the said rods or channel bars 10. The trays 15 and plaster material thereon consisting of the layers 26, 27 and 28, are secured together by the tie rods 21 and clamping nuts 25, and against the plates 23 which are adjusted to horizontal positions and engaging the opposing edges at each two adjoining trays 15. The trays 15 are then drawn firmly up by the tie rods 21 and nuts 25 to hold the plaster slabs firmly together and under pressure until the same have set and solidified into an integral, unitary mass enclosing the rods or bars 10. When the mass has become fully set, the said trays are released and removed, and the holes left in the plaster wall by the tie rods, as well as any seams which may have formed between the slabs, are pointed up to form a smooth unbroken wall.

When the lower edge of the wall is supported upon raised supports or blocks 13, as hereinabove described, the space between the lower ends of the wall and the floor may thereafter be closed with plaster or the like, or it may be closed by base board and ornamental molding.

It is to be noted that in carrying out the method of my invention it becomes readily possible to construct walls or partitions of any desired height, length and thickness by the use of the required number of separate trays and securing the same in edge to edge relation upon or against suitable supporting rods or members which further serve to reinforce the structure as a whole.

It is to be noted that the term "plaster material" as used in the specification and claims is intended to include any substance such as cement, mortar, plaster of Paris or other suitable substance or combinations of materials adapted for such use, and that the term "slab" is intended to specify a relatively thin mass of such plaster material, without regard to the degree of its plasticity or solidity.

Having thus described my said invention, what I claim and desire to secure by Letters Patent is:

1. The method of constructing a wall of the character described which comprises disposing a series of aligned, vertical supports, in spaced relation, anchoring said supports at their upper and lower ends, forming a plurality of slabs of plaster material, disposing said slabs, while in plastic state, at opposite sides of said series of vertical supports, subjecting said slabs to pressure to force their opposing surfaces and their contiguous edges into intimate contact and enclosing said vertical supports, securing said slabs in position, and then permitting said slabs to set and solidify into a unitary continuous wall structure.

2. The method of constructing a wall of the character described which comprises disposing a series of aligned, vertical supports in spaced relation, anchoring said vertical supports at their upper and lower ends, disposing a flat tray at each side of said series of vertical supports, supporting said trays in substantially horizontal position with their lower, opposing edges separated but in proximity, disposing a mass of plaster material, in plastic state and in the form of a relatively thin slab upon said trays, raising said trays and material thereon to vertical position and bringing the opposing surfaces of said plaster material into contact and surrounding said series of vertical supports, subjecting said trays to pressure to bring the material of said slabs into intimate contact, locking said trays together transversely in pairs and horizontally in series, permitting said material to set and solidify in place to form a continuous, unitary wall, and then unlocking said trays and removing the same.

3. The method of constructing a wall of the character described which comprises erecting a series of aligned, vertical supports, anchoring said supports in spaced relation, at their upper and lower ends, supporting a flat tray in substantially horizontal position at each side of said series of vertical supports with their lower opposing edges in spaced proximity adjacent the lower ends of said vertical supports, disposing a mass of plaster material, in plastic state and in the form of a relatively thin slab upon said trays, raising said trays and the material thereon to vertical position and against said vertical supports and bringing the opposing surfaces of said plaster material into contact and enclosing said series of vertical supports, drawing said supports together under pressure applied outwardly thereof to bring the opposing surfaces of said plaster material into intimate contact, permitting said material to set and solidify, and then releasing and removing said trays.

4. The method of constructing a wall of the character described which comprises disposing a series of aligned vertical rods, in spaced relation, anchoring said vertical rods at their upper and lower ends, disposing a flat support at each side of said series of fixed vertical rods, disposing a mass of plaster material, in plastic state, and in the form of a relatively thin slab upon said flat supports, providing the exposed surfaces of said slabs with a coating including an agglutinant, bringing said flat supports with the material thereon into vertical position and the coated, opposing surfaces of said material into contact and against said vertical rods, locking said flat supports together transversely in pairs, and horizontally in series, permitting said material to set and solidify in place, into a unitary wall structure, and then removing said flat supports.

5. The method of constructng a wall of the character described which comprises disposing a series of aligned, vertical rods in spaced relation, anchoring said rods at their upper and lower ends, disposing a flat support at each side of said series of vertical rods in substantially horizontal position with their lower opposing edges in spaced proximity adjacent the lower ends of said vertical rods, disposing a mass of plaster material, in plastic state, and in the form of a relatively thin slab upon said flat supports, providing the opposing surfaces of said slabs with a thin coating of plaster material, raising said trays and the material thereon to vertical position and against said vertical rods and bringing the opposing surfaces of said plaster material into contact with each other and against said series of vertical rods, drawing said flat supports together under pressure transversely in pairs to bring the opposing surfaces of said plaster material into intimate contact and against said vertical rods, locking said flat supports together transversely in pairs, and horizontally in side-by-side relation, permitting said material to set and solidify into a unitary wall structure, and then releasing and removing said flat supports.

6. The method of constructing a wall of the character described which comprises erecting a series of aligned, vertical rods, anchoring said rods at their upper and lower ends, supporting a flat tray at each side of said series of vertical rods in substantially horizontal position with their lower opposing edges in spaced proximity adjacent the lower ends of said vertical rods, disposing a mass of plaster material, in plastic state and in the form of a relatively thin slab upon said trays, providing the opposing surfaces of said slabs with a thin coating of plaster material, raising said trays and the material thereon to vertical position and against said vertical rods, and bringing the opposing surfaces of said plaster material into contact with each other and against said series of vertical rods, drawing said trays together under pressure transversely in pairs to bring the opposing surfaces of said plaster material into intimate contact and against said vertical rods, and locking said trays together transversely in pairs, and longitudinally in side-by-side relation, permitting said material to set and solidify into a unitary, continuous wall structure, and then releasing said locking means and removing said trays.

PATRICK J. O'CONNOR.